United States Patent
Gunugunuri et al.

(10) Patent No.: US 10,596,519 B1
(45) Date of Patent: Mar. 24, 2020

(54) MODIFIED FERRITE CATALYSTS FOR DIRECT NO DECOMPOSITION AND A METHOD OF MAKING AND USING A CATALYST

(71) Applicant: Toyota Motor Engineering & Manufacturing North America, Inc., Plano, TX (US)

(72) Inventors: Krishna Gunugunuri, Canton, MI (US); Charles Alexander Roberts, Farmington Hills, MI (US); Torin C. Peck, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/406,353

(22) Filed: May 8, 2019

(51) Int. Cl.
*B01D 53/94* (2006.01)
*B01J 37/03* (2006.01)
(Continued)

(52) U.S. Cl.
CPC ..... *B01D 53/9431* (2013.01); *B01D 53/9418* (2013.01); *B01D 53/9454* (2013.01);
(Continued)

(58) Field of Classification Search
CPC ............ B01D 53/9413; B01D 53/9422; B01D 53/9431; B01D 2255/91; B01D 2257/402;
(Continued)

(56) References Cited

U.S. PATENT DOCUMENTS 6,395,244 B1 * 5/2002 Hartweg ............ B01D 53/9422 423/210
6,444,178 B1 * 9/2002 Hartweg ............ B01D 53/9418 422/172
(Continued)

FOREIGN PATENT DOCUMENTS

| CN | 102665899 A | * | 9/2012 | ............ B01J 23/002 |
| CN | 107617440 A | | 1/2018 | |
| WO | WO 2016 094 815 A1 | * | 6/2016 | .......... B01J 23/8892 |

OTHER PUBLICATIONS

Moghaddam, F. et al., "Nano CoCuFe2O4 catalyzed coupling reaction of acid chlorides with terminal alkynes: A powerful toolbox for palladium-free ynone synthesis," Catalysis Communications 102, pp. 71-75 (2017).
(Continued)

*Primary Examiner* — Timothy C Vanoy
(74) *Attorney, Agent, or Firm* — Christopher G. Darrow; Darrow Mustafa PC (57) ABSTRACT

$NO_x$ abatement compositions have a formula $M_xCu_{1-x}Fe_2O_4$, wherein M is a substitution metal cation that can be any of cobalt, nickel, and zinc; and x is greater than zero and less than one. Such compositions can serve as direct decomposition catalysts and/or passive adsorption/storage components. Methods for synthesizing the compositions include alkaline precipitation of solutions containing nitrate salts of copper, iron, and at least one of cobalt, nickel, and zinc.

20 Claims, 5 Drawing Sheets

(51) Int. Cl.
  *B01J 37/06* (2006.01)
  *B01J 37/00* (2006.01)
  *B01J 37/08* (2006.01)
  *B01J 23/755* (2006.01)
  *B01J 23/75* (2006.01)
  *B01J 23/80* (2006.01)
  *F01N 3/08* (2006.01)
  *F01N 3/20* (2006.01)

(52) U.S. Cl.
  CPC ............ *B01J 23/75* (2013.01); *B01J 23/755* (2013.01); *B01J 23/80* (2013.01); *B01J 37/0036* (2013.01); *B01J 37/03* (2013.01); *B01J 37/06* (2013.01); *B01J 37/08* (2013.01); *F01N 3/0814* (2013.01); *F01N 3/0842* (2013.01); *F01N 3/2066* (2013.01); *B01D 2255/20738* (2013.01); *B01D 2255/20746* (2013.01); *B01D 2255/20753* (2013.01); *B01D 2255/20761* (2013.01); *B01D 2255/20792* (2013.01); *B01D 2255/91* (2013.01); *F01N 2570/14* (2013.01)

(58) Field of Classification Search
  CPC ......... B01D 2257/404; B01D 2258/012; B01J 37/00; B01J 37/03; B01J 23/005; F01N 3/0814; F01N 3/0842; F01N 3/28; F01N 3/2882; F01N 13/009; F01N 2250/12; F01N 2570/14
  See application file for complete search history.

(56) References Cited

U.S. PATENT DOCUMENTS

| | | | |
|---|---|---|---|
| 8,540,952 B2 * | 9/2013 | Swallow | B01D 53/94 423/213.2 |
| 2009/0044504 A1 * | 2/2009 | Ueda | B01D 53/8675 55/524 |
| 2009/0317307 A1 * | 12/2009 | Kanazawa | B01D 53/9481 422/171 |
| 2013/0244866 A1 * | 9/2013 | Najbar | B01D 53/8628 502/184 |
| 2018/0339268 A1 * | 11/2018 | Gunugunuri | B01D 53/9413 |
| 2019/0076827 A1 * | 3/2019 | Gunugunuri | B01J 23/78 |

OTHER PUBLICATIONS

Kanagaraj, M. et al., "Structural and magnetic properties of CuFe2O4 as-prepared and thermally treated spinel nanoferrites," Indian Journal of Pure & Applied Physics, vol. 52, pp. 124-130 (Feb. 2014).
Thanh et al., "Cation distribution in CuFe2O4 nanoparticles: Effects of Ni doping on magnetic properties," J. Appl. Phys., 120, 142115, 8 pages (2016).

* cited by examiner

MODIFIED FERRITE CATALYSTS FOR DIRECT NO DECOMPOSITION AND A METHOD OF MAKING AND USING A CATALYST

TECHNICAL FIELD

The present disclosure generally relates to catalysts for conversion and storage of undesired components in a combustion exhaust and, more particularly, to catalysts for the direct decomposition of $NO_x$.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Nitric oxide (NO) and nitrogen dioxide ($NO_2$) are noxious components of combustion exhaust streams. Many catalysts for abating NO and $NO_2$ ($NO_x$) produce undesirable products, such as nitrous oxide ($N_2O$) or ammonia. Direct decomposition reactions, in which $NO_x$ is converted directly to $N_2$ and $O_2$ are known, but catalysts for direct decomposition frequently have low activity and/or selectivity.

Further, most conversion catalysts have little-to-no activity at low temperature, such that NOx is not converted during vehicle "cold start" conditions, when exhaust and converter temperature are low. Passive $NO_x$ adsorbers, which retain NOx at low temperature and release it at higher temperature, can minimize this issue.

Accordingly, it would be desirable to provide improved catalysts for direct decomposition of $NO_x$, having high activity and selectivity, and improved $NO_x$ adsorption materials.

SUMMARY

This section provides a general summary of the disclosure and is not a comprehensive disclosure of its full scope or all of its features.

In various aspects, the present teachings provide a two-stage $NO_x$ abatement device for removal of $NO_x$ from engine exhaust gas during a cold start. The device includes an enclosure having upstream and downstream portions defined relative to an intended direction of flow of exhaust gas. The device further includes a low-temperature $NO_x$ storage component configured to adsorb $NO_x$ when at low temperature, and to desorb $NO_x$ when at higher temperature, and comprising an $NO_x$ abatement composition having a formula $M_xCu_{1-x}Fe_2O_4$, wherein M is a substitution metal cation that can be any of cobalt, nickel, and zinc; and x is greater than zero and less than one. The device additionally includes a $NO_x$ conversion catalyst located downstream from the storage component, and configured to catalyze conversion of $NO_x$. During an engine cold start, $NO_x$ is retained in the storage component until the exhaust and the device have warmed sufficiently to activate the downstream conversion catalyst.

In other aspects, the present teachings provide a method of synthesizing an $NO_x$ abatement composition. The method includes a step of adding alkali to a mixed-metal nitrate solution until a pH of 9-10 is reached, resulting in precipitation of a crude $NO_x$ abatement composition. The mixed-metal nitrate solution includes $Fe(NO_3)_3$; $Cu(NO_3)_2$; and at least one additional metal nitrate. The at least one additional metal nitrate can be any of $Co(NO_3)_2$, $Zn(NO_3)_2$, and $Ni(NO_3)_2$.

In still other aspects, the present teachings provide a method for direct decomposition removal of $NO_x$ from a gas mixture. The method includes a step of exposing a gas mixture having $NO_x$ to an $NO_x$ abatement composition having a formula $M_xCu_{1-x}Fe_2O_4$, wherein M is a substitution metal cation that can be any of cobalt, nickel, and zinc; and x is greater than zero and less than one.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide methods for synthesizing a catalyst having both $NO_x$ direct decomposition catalytic activity, as well as passive $NO_x$ storage capability. The present teachings further provide two-stage methods and devices for the removal of $NO_x$ from a combustion exhaust stream, catalytic converters having the catalyst, and methods for making the catalyst. The disclosed catalysts accelerate direct decomposition of $NO_x$ to $N_2$ and $O_2$ with appreciable catalytic activity, and very high selectivity. In one case, selectivity for $N_2$ product formation, as opposed to formation of $NH_3$ or other products of selective catalytic reduction (SCR), exceeds 95%.

NO$_x$ abatement compositions of the present disclosure have a generic formula M$_x$Cu$_{1-x}$Fe$_2$O$_4$ (M=any of Co, Ni, and Zn), and have strong NOx storage capability as well as improved catalytic activity in a temperature range of 400° C.-650° C. as compared to an undoped CuFe$_2$O$_4$ catalyst. Methods for synthesizing the disclosed compositions include co-precipitation of nitrate salts of copper, iron, and the substitution metal, M. In particular, it is shown that the identity of the anion, nitrate, is important for activity of the resulting material. NO$_x$ abatement devices have an NO$_x$ adsorption stage followed by a decomposition catalyst stage. NO$_x$ abatement compositions of the present teachings are present in the NO$_x$ abatement compositions adsorption stage, and an NO$_x$ abatement compositions abatement catalyst is present in the catalyst stage. During a cold start, NO$_x$ is adsorbed by a disclosed composition in the adsorption stage. As exhaust heats up, adsorbed NO$_x$ desorbs and travels to the catalyst stage, where it is decomposed.

Thus, NO$_x$ abatement compositions are disclosed, having a spinel structure and a formula according to Formula A:

$$M_xCu_{1-x}Fe_2O_4 \qquad \text{A.}$$

wherein M is a substitution metal that can be any of cobalt, nickel, and zinc; and x is greater than zero and less than one. In certain particular implementations, x can be 0.5 or 0.75. It will be understood that unsubstituted cuprospinel (CuFe$_2$O$_4$) is generally an inverse spinel, with copper(II) generally occupying octahedral sites in the spinel structure and iron(III) occupying both tetrahedral and octahedral sites. Thus, as the substitution metal(s) partially replaces cupric ions in the spinel structure, the substitution metal(s) will generally be expected to occupy octahedral sites in the NO$_x$ abatement compositions of the present teachings.

The disclosed NO$_x$ abatement compositions have improved catalytic activity toward the direct decomposition of NO$_x$ to N$_2$ and O$_2$, where NO$_x$ is defined as any combination nitric oxide (NO) and (NO$_2$). Direct decomposition of NO$_x$ proceeds according to either or both of Reactions I and II:

$$2NO \rightarrow N_2 + O_2 \qquad \text{(I), and}$$

$$2NO_2 \rightarrow N_2 + 2O_2 \qquad \text{(II).}$$

Direct decomposition reactions are generally distinguishable from competing reactions by product formation. For example, incomplete decomposition reactions such as exemplary Reactions III and IV produce undesirable nitrous oxide rather than nitrogen gas:

$$4NO \rightarrow 2N_2O + O_2 \qquad \text{(III), and}$$

$$4NO_2 \rightarrow 2N_2O + 3O_2 \qquad \text{(IV).}$$

Similarly, various selective catalytic reduction (SCR) reactions can occur in the presence of a gaseous reducing agent, such as ammonia or alkane, and produce water, or water and carbon dioxide, rather than oxygen gas, as exemplified in Reactions V through VIII:

$$4NO + 4NH_3 + O_2 \rightarrow 4N_2 + 6H_2O \qquad \text{(V),}$$

$$2NO_2 + 4NH_3 + O_2 \rightarrow 3N_2 + 6H_2O \qquad \text{(VI),}$$

$$NO + CH_4 + O_2 \rightarrow N_2 + CO_2 + 2H_2O \qquad \text{(VII), and}$$

$$2NO_2 + 2CH_4 + 2O_2 \rightarrow N_2 + 2CO_2 + 2H_2O \qquad \text{(VIII).}$$

When oxygen is present, NO$_x$ may also be oxidized, such as shown in Reaction IX:

$$2NO + O_2 \rightarrow 2NO_2 \qquad \text{(IX).}$$

Under controlled reaction conditions where catalyst is exposed to a gas flow containing nitric oxide, any or all of Reactions I and IV can occur primarily, but Reaction IX can also occur secondarily as O$_2$ is produced by reactions I and IV. A combined reaction is shown in Reaction X:

$$(4a+4c-2b)NO \rightarrow aN_2 + bO_2 + cN_2O + (2a-2b+c)NO_2 \qquad \text{(X)}$$

A nitrogen product selectivity (N$_2$ selectivity) can be defined for such a combined Reaction X according to Equation 1:

$$N_2 \text{ selectivity (\%)} \frac{2[N_2]}{2[N_2] + 2[N_2O] + [NO_2]} \qquad \text{Eq. 1}$$

A method of synthesizing NO$_x$ abatement compositions, of the type described above, is also disclosed. The synthesis method includes a step of adding alkali to a mixed-metal nitrate solution until a pH of 9-10 is reached, resulting in precipitation of the crude NO$_x$ abatement composition. This step can alternatively be referred to as an alkaline precipitation step. The alkali can include NaOH, another hydroxide, or any other suitable alkaline material. The mixed metal nitrate solution contains Fe(NO$_3$)$_3$; Cu(NO$_3$)$_2$; and at least one additional metal nitrate selected from the group consisting of Co(NO$_3$)$_2$, Zn(NO$_3$)$_2$, and Ni(NO$_3$)$_2$. The synthesis method can additionally include at least one step of washing the precipitate to produce a pure NO$_x$ abatement composition. The method can further include steps of grinding the pure NO$_x$ abatement composition to a desired particle size, and/or calcining the pure NO$_x$ abatement composition to remove volatile impurities.

It will be understood that the mixed-metal nitrate solution will generally include the various nitrates present at molar ratios sufficient to achieve the stated stoichiometric ratios of metal in Formula A, above. Thus, the combination of Cu(NO$_3$)$_2$ and the at least one additional metal nitrate will generally be present, relative to Fe(NO$_3$)$_3$, at a molar ratio of 1:2. In some implementations, the at least one additional metal nitrate will be present relative to Cu(NO$_3$)$_2$ at a molar ratio within a range of from about 1:1 to about 3:1, inclusive.

Figure 1A:
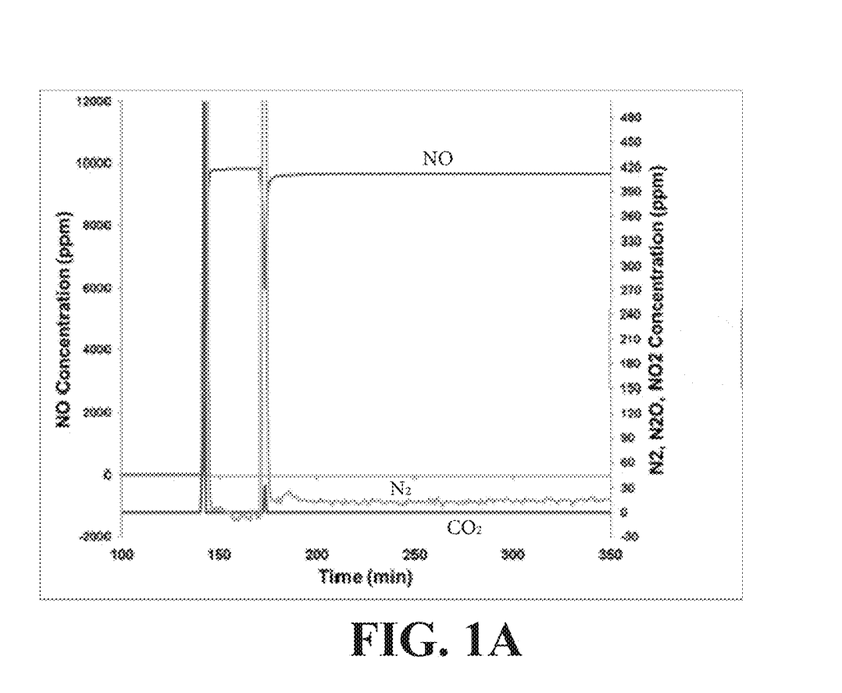
FIGS. 1A and 1B are plots of NO direct decomposition activity of catalysts made by a comparative method, and method of the present teachings, respectively.
Figure 1B:
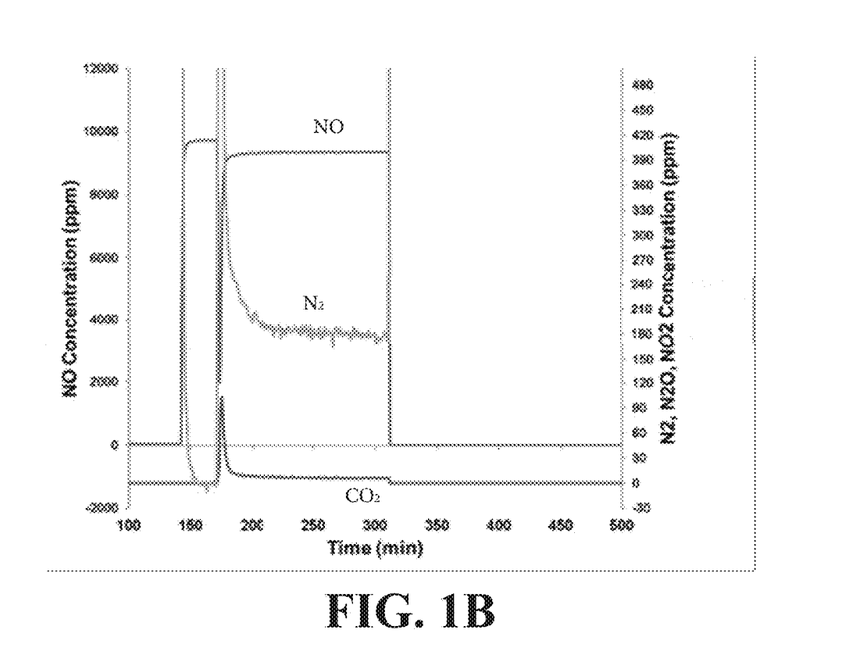

It will be noted that the alkaline precipitation step necessarily should be performed with nitrate salts of the metal ions that make up the NO$_x$ abatement composition, rather than with salts of the component metal cations having different anions than nitrate. FIG. 1A shows the NO$_x$ direct decomposition activity of a competing NO$_x$ abatement composition made with a method similar to that described above, except where the alkaline precipitation step is performed with chloride salts (FeCl$_3$, CuCl$_2$, and CoCl$_2$), to produce the comparative composition Co$_{0.5}$Cu$_{0.5}$Fe$_2$O$_4$. FIG. 1B shows similar data for the composition of the present teachings, where the alkaline precipitation step is performed with the required nitrate salts. A comparison of FIGS. 1A and 1B indicates that only the composition synthesized by the disclosed method (using nitrate salt precursors) has appreciable NO$_x$ direct decomposition activity. In particular, the composition formed by the disclosed method generates 165 ppm N$_2$ and has an activity of about 0.0134 µmol/g/s in the example of FIG. 1B, whereas the comparative example of FIG. 1A generates only 1 ppm N2 and has an activity of about 0.00015 mol/g/s.

Figure 2A:
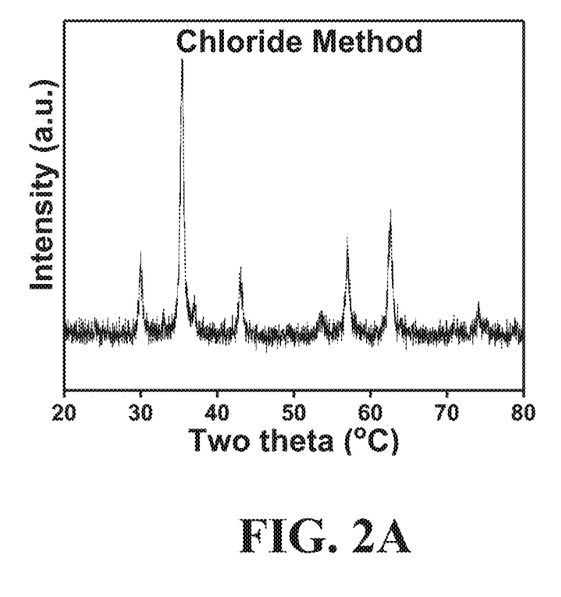
FIGS. 2A and 2B show x-ray diffraction spectra of the compositions of FIGS. 1A and 1B, respectively.
Figure 2B:
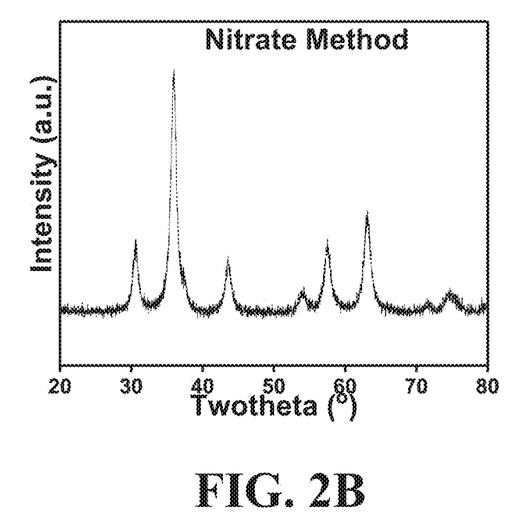

FIGS. 2A and 2B show x-ray diffraction spectra of the compositions of FIGS. 1A and 2B, respectively. The results of FIGS. 2A and 2B indicate that the comparative composition (made using chloride precursors) and the abatement composition of the present teachings (made using nitrate precursor) exhibit only peaks corresponding to the expected inverse spinel structure, and are generally identical to one another. This suggests that the activity difference is not due to any broad structural differences. Without being bound by any particular theory, it may be speculated that the far lower activity of the comparative composition, synthesized with chloride precursor, is due to chloride ion impurities that interfere with direct decomposition activity and are difficult to remove during washing steps. It will be understood that the compositions discussed hereinafter are synthesized by the above-described synthesis method, using nitrate salt precursors in the alkaline precipitation step.

Figure 3:
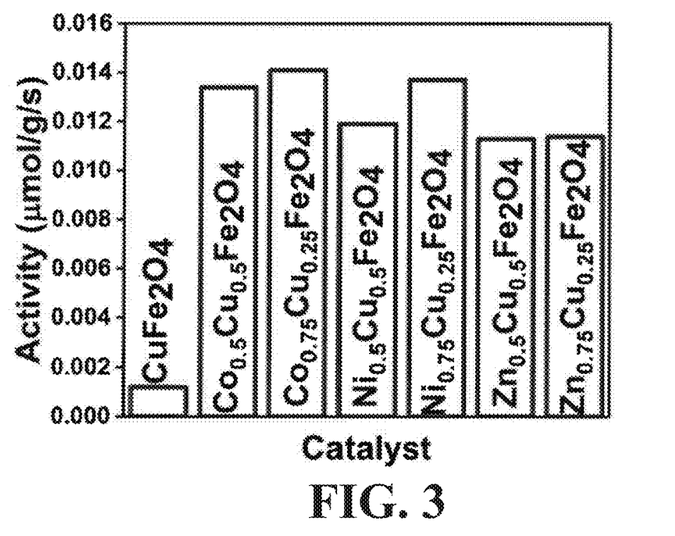
FIG. 3 is a plot of NO decomposition activity for unsubstituted cuprospinel and various $NO_x$ abatement compositions of the present teachings, assessed at 500 ° C.

FIG. 3 is a plot of NO decomposition activity for unsubstituted cuprospinel and various $NO_x$ abatement compositions of the present teachings, assessed at 500° C. The results shown in FIG. 3 indicate that the addition of Co, Ni and Zn to the $CuFe_2O_4$ improves the direct NO decomposition activity. Interestingly, $M_{0.75}Cu_{0.25}Fe_2O_4$ (M=Co, Ni, and Zn) exhibits greater activity compared to the $M_{0.5}Cu_{0.5}Fe_2O_4$ (M=Co, Ni, and Zn) catalysts. These measurements suggest that the presence of less copper at octahedral sites in the spinel leads to improved activity. Among the various compositions tested in FIG. 3, $Co_{0.75}Cu_{0.25}Fe_2O_4$ exhibits the greatest direct NO decomposition activity.

Figure 4:
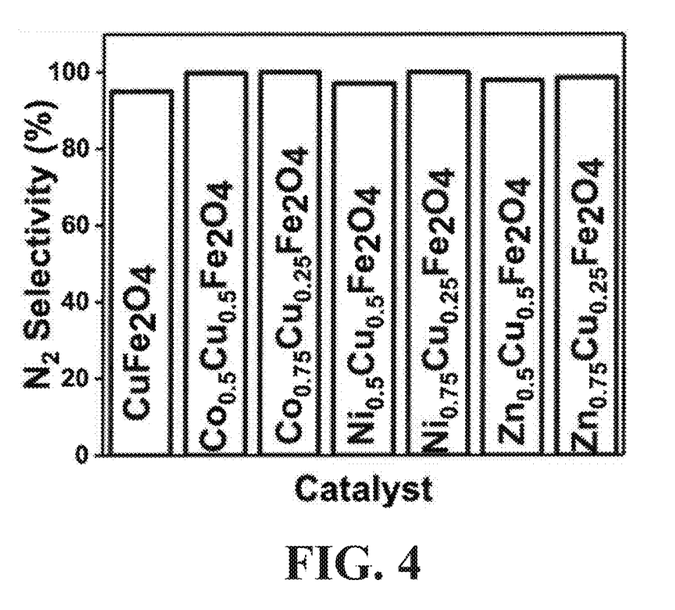
FIG. 4 shows N2 selectivity profiles of the unsubstituted cuprospinel and various $NO_x$ abatement compositions of FIG. 3.

FIG. 4 shows N2 selectivity profiles of the unsubstituted cuprospinel and various $NO_x$ abatement compositions of FIG. 3. The results of FIG. 4 confirm that all assayed compositions predominantly catalyze direct $NO_x$ decomposition to $N_2$, rather than the less desirable $N_2O$ or $NO_2$, products of Reactions III-X. FTIR detection allows distinction of less desirable $N_2O/NO_2$ from the desired $N_2$ product, and calculation of $N_2$ selectivity, as shown in FIG. 4. In particular, all the compositions assayed, including unsubstituted cuprospinel and the various $NO_x$ abatement compositions of the present teachings, exhibit more than 90% $N_2$ selectivity, although the substituted cuprospinels (the $NO_x$ abatement compositions of the present teachings) exhibit slightly higher $N_2$ selectivity than does unsubstituted cuprospinel. In particular, the $Co_{0.75}Cu_{0.25}Fe_2O_4$ composition exhibits 100% selectivity towards nitrogen. Because the enhancement in $N_2$ selectivity resulting from copper replacement is slight, these measurements suggest that addition of Co, Ni and Zn to the $CuFe_2O_4$ do not appreciably change the N2 selectivity of CuFe2O4.

Figure 5:
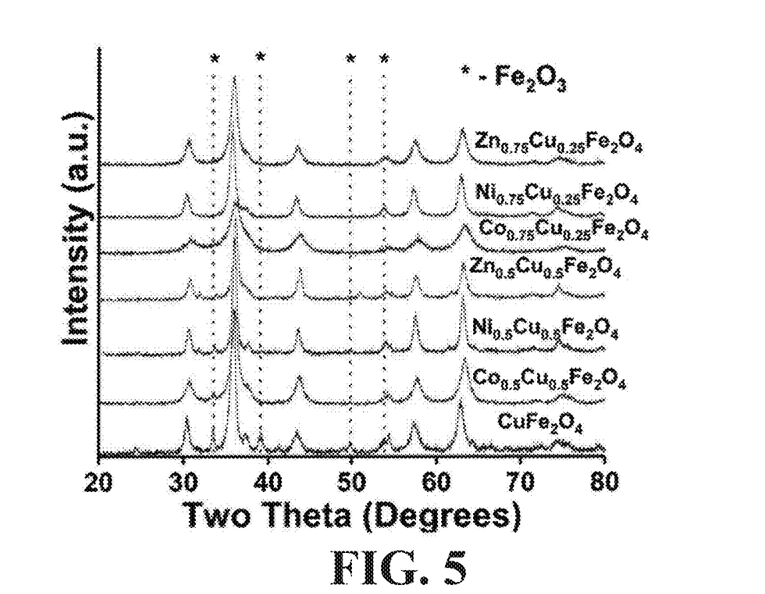
FIG. 5 shows x-ray diffractions (XRD) spectra of the unsubstituted cuprospinel and various $NO_x$ abatement compositions of FIGS. 3 and 4.

FIG. 5 shows x-ray diffractions (XRD) spectra of the unsubstituted cuprospinel and various $NO_x$ abatement compositions of FIGS. 3 and 4. These structural characterization measurements facilitate an understanding of the influence of the substitution metal, M, on the base structural properties of $CuFe_2O_4$ cuprospinel. After calcination, unsubstituted cuprospinel exhibited peaks at 30.14, 35.94, 37.31, 43.34, 53.86, 57.45, 62.93 degrees. These 2θ values correspond to reflections of (220), (311), (222), (400), (422), (511) and (440) planes that are indications of the presence of the cubic inverse spinel structure, and are consistent with the presence of $CuFe_2O_4$ cuprospinel. Further, the diffraction peaks match well with the reported values (JCPDS file No:10-325) and are indexed with the lattice parameter of a=8.339±1 Å. Along with the peaks due to $CuFe_2O_4$ cuprospinel, the sample also exhibits peaks at 33.4, 39, 49.7, 53.8 degrees, which index to $Fe_2O_3$ (JCPDS file no: 1309-37-1). It is believed that the formation of $Fe_2O_3$ occurs due to the oxidation of $Fe_3O_4$ during the calcination. Interestingly, none of the substituted compositions of the present teachings, $M_xCu_{1-x}Fe_2O_4$, exhibit the $Fe_2O_3$ peaks. This result suggests that the addition of the substituted divalent metal cation to $CuFe_2O_4$ suppresses the formation of $Fe_2O_3$ during the calcination. Also, there are no peaks corresponding to either pristine Co, Ni, and Zn oxides or compounds between Fe/Cu and Co, Ni, and Zn metals. This suggest that the substituted divalent metal cation is completely incorporated into the inverse spinel lattice and stabilizes the structure against oxidation during the calcination. While the XRD results of FIG. 5 show no evidence of $Fe_2O_3$, it is to be noted that XRD has a lower limit of detection of this phase of about 5%.

Mossbauer spectroscopic measurements are made on several $NO_x$ abatement compositions of the present disclosure, in order to measure the presence of $Fe_2O_3$ at levels below the detection limits of XRD, and the results on shown in Table 1. Interestingly, only $Ni_{0.5}Cu_{0.5}Fe_2O_4$ has a considerable amount of $Fe_2O_3$ after the calcination; the other three compositions assayed do not form any $Fe_2O_3$ after the calcination. Also, $Ni_{0.5}Cu_{0.5}Fe_2O_4$ catalyst exhibits least activity among the four investigated catalysts. These results suggest that the formation of $Fe_2O_3$ during the calcination reduces the activity of cuprospinel based compositions for direct NO decomposition. The substitution of Co, Ni, and/or Zn in the $CuFe_2O_4$ (which presumably contains a portion of $Fe_3O_4$) suppresses the formation of $Fe_2O_3$ during the calcination and improves the direct NO decomposition activity.

TABLE 1

$Fe_2O_3$ Content of NOx Abatement Compositions as Measured by Mossbauer

| NOx Abatement Composition | Weight Percent of $Fe_2O_3$ Detected |
|---|---|
| $Co_{0.5}Cu_{0.5}Fe_2O_4$ | 0 |
| $Ni_{0.5}Cu_{0.5}Fe_2O_4$ | 6 |
| $Co_{0.75}Cu_{0.25}Fe_2O_4$ | 0 |
| $Ni_{0.75}Cu_{0.25}Fe_2O_4$ | 0 |

Thus, in view of the cumulative results shown above, a method for removal of $NO_x$ from an exhaust gas stream is also disclosed. The method for removal of $NO_x$ from an exhaust gas stream includes a step of flowing the exhaust gas stream through an $NO_x$ abatement composition of the present teachings. In various implementations, the exhaust gas stream can include $NO_x$, and exclude reducing agents, so that SCR, or any other conversion routes requiring a reducing agent, are not possible. It will be understood that this is due to the particularly high activity for direct $NO_x$ decomposition as disclosed herein. In certain implementations, the exhaust gas stream should be within a temperature range of 450° C. to 650° C., just prior to contacting the $NO_x$ abatement composition. The $NO_x$ abatement composition, as employed in the method for removal of $NO_x$ from an exhaust gas stream, is as described above, and is synthesized according to the method for synthesizing an $NO_x$ abatement composition as described above.

Figure 6:
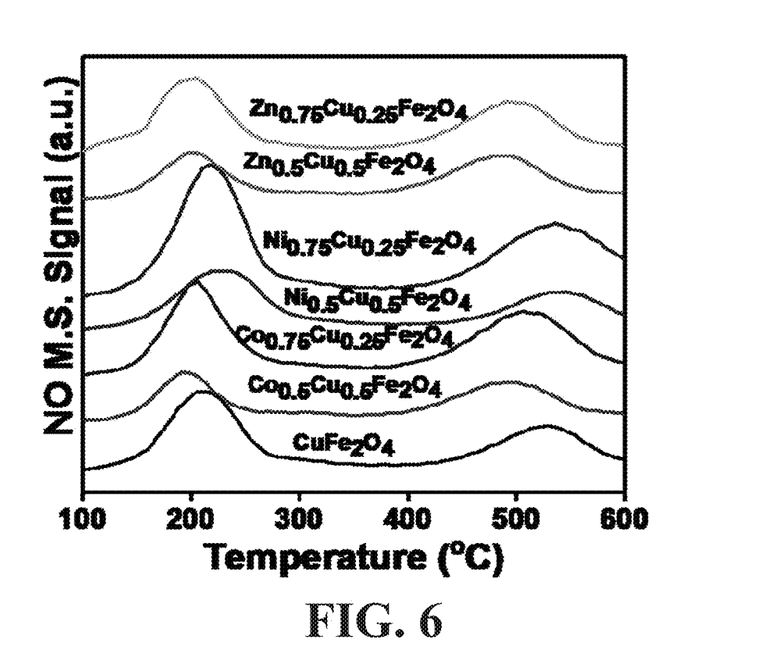
FIG. 6 shows temperature-dependent $NO_x$ adsorption/desorption traces for the compositions of FIGS. 3-5.

The $NO_x$ abatement compositions of the present teachings further possess considerable passive $NO_x$ adsorption capability, as shown below. FIG. 6 shows temperature-dependent $NO_x$ adsorption/desorption traces for the compositions of FIGS. 3-5. The $NO_x$ storage capacity values of $CuFe_2O_4$ and the various $M_xCu_{1-x}Fe_2O_4$ compositions are shown in Table 2. With reference to FIG. 2, all of the NOx abatement compositions of the present teachings exhibit greater $NO_x$ storage capacity than does unsubstituted $CuFe_2O_4$. Among the various compositions $Ni_{0.75}Cu_{0.25}Fe_2O_4$ exhibits the greatest $NO_x$ storage capacity, more than two-fold greater than that of unsubstituted $CuFe_2O_4$. These results show that introduction of the substitution metal, M, into octahedral sites improves the $NO_x$ storage performance.

TABLE 2

NOx storage capacities of selected compositions

| Catalyst | $NO_x$ storage capacity (µmol/g) |
| --- | --- |
| $CuFe_2O_4$ | 18.5 |
| $Co_{0.5}Cu_{0.5}Fe_2O_4$ | 24.4 |
| $Co_{0.75}Cu_{0.25}Fe_2O_4$ | 27.9 |
| $Ni_{0.5}Cu_{0.5}Fe_2O_4$ | 29.1 |
| $Ni_{0.75}Cu_{0.25}Fe_2O_4$ | 45.5 |
| $Zn_{0.5}Cu_{0.5}Fe_2O_4$ | 35.3 |
| $Zn_{0.75}Cu_{0.25}Fe_2O_4$ | 28.1 |

With reference to FIG. 6, after $NO_x$ storage, the catalyst releases NO at higher temperatures for direct NO decomposition. Interestingly, all of the compositions assayed exhibit similar desorption profiles, with a large portion of NO desorbed in the temperature range of from about 170° C. to about 250° C.

Figure 7:
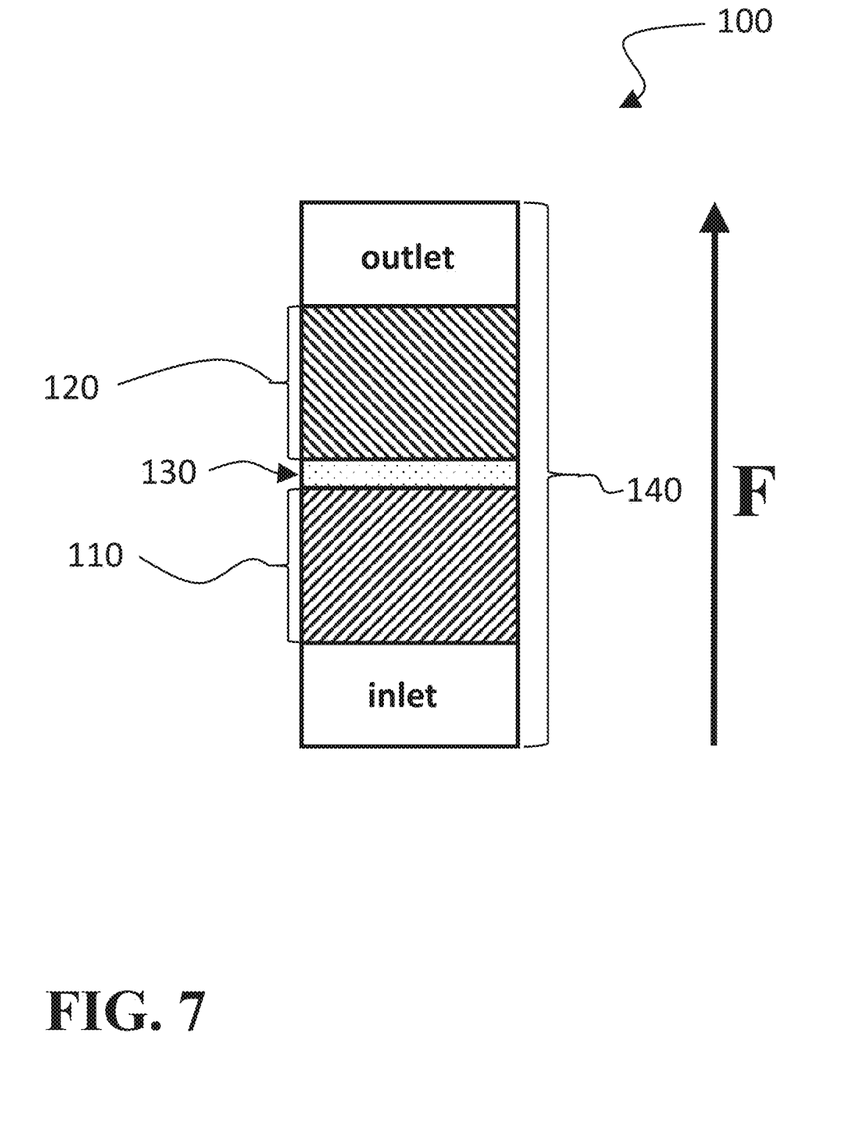
FIG. 7 shows a schematic plan view of an exemplary two-stage $NO_x$ abatement device.

Thus, and with reference to FIG. 7, a two-stage $NO_x$ abatement device 100 is disclosed. FIG. 7 shows a schematic plan view of an exemplary two-stage device. The device 100 can include an enclosure 140 having an inlet and an outlet. The enclosure 140 can be configured to contain a low-temperature $NO_x$ storage component 110, and a high-temperature $NO_x$ conversion catalyst 120 located downstream from the storage component. The $NO_x$ storage component 110 is configured to adsorb $NO_x$ when at low temperature, and to desorb $NO_x$ when at higher temperature. Thus, and in view of the results presented above in FIG. 6 and Table 2, the $NO_x$ storage component 110 will generally include an $NO_x$ abatement composition of the present teachings, having the formula $M_xCu_{1-x}Fe_2O_4$, as described above.

The $NO_x$ conversion catalyst 120 is generally configured to catalyze conversion of $NO_x$, through any of the reactions I-X described above. In certain implementations, the conversion catalyst 120 can specifically exclude an $NO_x$ abatement composition of the present teachings. In certain implementations, the conversion catalyst 120 can include a catalyst operable to catalyze direct $NO_x$ decomposition, according to Reactions I and/or II, above.

In some implementations, the storage component 110 and the conversion catalyst 120 can be spatially separated from one another, as illustrated in the example of FIG. 7. In such implementations, the storage component 110 and the conversion catalyst 120 can be in adjacent contact, or, as shown in FIG. 7, can be separated by a separation space 130. When present, such a separation space 130 can be substantially vacant, or can be occupied with a porous, gas permeable, or other suitable material.

The terms "upstream" and "downstream" are used herein in relation to an intended direction of exhaust gas stream flow through the device 100, represented by the arrow F in FIG. 7. For example, the storage component 110 can be positioned in an upstream portion of the exhaust gas stream, a region proximal to a gas inlet portion, and the conversion catalyst 120 can be positioned in a downstream portion of the exhaust gas stream, a region proximal to a gas outlet portion.

It will be understood that in implementations in which the storage component 110 is positioned in an upstream portion of the exhaust gas stream and the conversion catalyst 120 is positioned in a downstream portion of the exhaust gas stream, this can cause the exhaust gas stream to encounter the storage component 110 before the exhaust gas stream encounters the conversion catalyst 120.

Thus, during a vehicle "cold start", when exhaust gas is at relatively low temperature, the low temperature exhaust gas will first encounter the storage component 110, where it will be adsorbed and stored, according to the thermal adsorption desorption profiles of FIG. 4. As the exhaust gas warms with increasing duration of engine operation, the storage component 110 will warm as well, resulting in desorption of the temporarily stored $NO_x$, so that the $NO_x$ can flow downstream to the conversion catalyst. It will be understood that most $NO_x$ conversion catalysts will have low-to-negligible catalytic activity at low, cold start temperatures. Thus, one benefit of the present device 100 is that cold $NO_x$ will be retained in the storage component until the exhaust and the device 100 have warmed sufficiently to activate the downstream conversion catalyst 120. As such, it will be desirable that the conversion catalyst 120 be thermally matches with the storage component 110. For example, it may be desirable that the conversion catalyst 120 achieve at least 50% of maximum catalytic activity at a temperature of 300° C. or 400° C., so that it will be sufficiently active when $NO_x$ desorption from the storage component 110 begins.

The catalyst systems of the present disclosure can be used in a chamber or an enclosure, such as a catalytic converter, having an inlet and an outlet. As is commonly known to those of ordinary skill in the art, such a chamber or enclosure can be configured to receive an exhaust gas stream through the inlet and to exit the exhaust gas stream through the outlet, such that the exhaust gas stream has a particular or defined flow direction.

The present invention is further illustrated with respect to the following examples. It needs to be understood that these examples are provided to illustrate specific embodiments of the present invention and should not be construed as limiting the scope of the present invention.

EXAMPLE 1

Synthesis of NOx Abatement Compositions $CuFe_2O_4$ is purchased from Sigma Aldrich and calcined at 400° C. for 1 hour. The $M_xCu_{1-x}Fe_2O_4$ (M=Co, Ni, and Zn) compositions are synthesized by a co-precipitation method using NaOH as a precipitating agent. In a typical synthesis procedure, the required amounts of $Fe(NO_3)_3$, $Cu(NO_3)_2$, and other substitution metal nitrates ($Co(NO_3)_2$, $Zn(NO_3)_2$, or $Ni(NO_3)_2$) are dissolved separately in deionized water and mixed together. 200 ml of 2 M sodium hydroxide is prepared and slowly added to the nitrate salt solution dropwise. The pH of the solution is constantly monitored as the NaOH solution is added. The reactants are constantly stirred using a magnetic stirrer until a pH of 9-10 is reached, producing a precipitate. The precipitate is then washed several times with distilled water and then with ethanol. The supernatant liquid is then decanted, and filtered to obtain the clean precipitate. The clean precipitate is then dried overnight at 120° C. The resulting substance is then ground into a fine powder and calcined at 500 ° C., with a 2 ° C/min ramp rate, for 1 hour. The various $M_xCu_{1-x}Fe_2O_4$ (x=0.5, 0.75) compositions are prepared by varying the ratios of substitution metal nitrate and $Cu(NO_3)_2$ according to the desired stoichiometric ratio in the composition.

EXAMPLE 2

Characterization of $NO_x$ Abatement Compositions

The phase composition of Examples 1-4 and the Comparative Example is measured using X-ray diffraction measurements. X-ray powder diffraction (XRD) measurements are performed using a Rigaku SmartLab X Ray Diffractometer. Spectra are collected over a 2 θ range of 20-80 degrees at a rate of 0.5 degrees per minute with a step size of 0.02 degrees per step.

Structural assignments are made using PDXL software. The phase composition of the materials is determined using the ICDD-PDF database.

Mossbauer measurements are made with a constant acceleration spectrometer using a 2 GBq 57 CoRh source calibrated using α-Fe at room temperature. Spectra are collected at temperatures ranging from 50 K in a Janis SH1-850 closed cycle refrigeration system.

NO adsorption capacities of the $CoFe_2O_4$ and K/ $CoFe_2O_4$ catalysts are measured using NETZSCH STA-449 thermogravimetric analyzer equipped with mass spectrometer. Before the experiment, the catalysts are preheated to 600° C. in the presence of 20% $O_2$/He. After the pretreatment, the temperature is decreased to 100° C. Then NO is adsorbed by passing 2% NO/He over the catalyst for 4 hours. The NO adsorption capacity is calculated by measuring the weight before and after NO adsorption.

The NO adsorption properties are measured using in situ Fourier transform infrared (FT-IR) spectroscopic measurements. The Harrick High Temperature Cell with environmental (gas flow) and temperature control is used for in situ diffuse-reflectance FT-IR spectroscopy. Spectra are recorded using a Thermo Scientific Nicolet 8700 Research FT-IR Spectrometer equipped with a liquid N2 cooled MCT detector. Spectra are obtained with a resolution of 2 $cm^{-1}$ and by averaging 64 scans. In situ diffuse-reflectance FT-IR spectra are collected during NO adsorption at 300° C. Prior to NO adsorption, the sample is first pretreated at 350° C. in 30 ml/min of 10% $O_2$/He. The background spectrum (64 scans) is of the catalyst after cooling to 300° C. in 30 ml/min of UHP He. Adsorption of NO is achieved by flowing 30 ml/min of 1% NO over the catalyst for 25 min. Adsorption of NO is allowed to proceed for 25 min while spectra are obtained every minute using a series collection. To compare peak intensities among different catalyst samples, the adsorption spectra are normalized to the NO gas phase peak at ~1876 $cm^{-1}$.

The NO desorption properties are measured using temperature programmed desorption of NO (NO-TPD) experiment. The NO-TPD experiments are performed using 3flex Surface Characterization Analyzer from Micromeritics equipped with mass spectrometer for gas phase analysis. Before the experiment, the catalysts are preheated to 300° C. in the presence of 20% O2/He. After pretreatment the temperature is decreased to 100° C. and NO is adsorbed by passing 2% NO/He over the sample for 1 hour. Following NO adsorption, physisorbed gases are removed by passing helium for 1 hour. NO desorption properties are measured by ramping the temperature from 100° C. to 700° C. in the presence of helium. The desorbed gases (NO, $N_2$, $O_2$, $N_2O$, and $NO_2$) are monitored by using an MKS Cirrus-2 mass spectrometer.

The direct $NO_x$ decomposition measurements are performed in a fixed bed flow reactor. The direct $NO_x$ decomposition measurements are performed using ~1% $NO_x$, balance helium, with a gas hourly space velocity of 2,100 $h^{-1}$ and in the temperature region of 450° C.-650° C. Before the reaction, catalysts are pretreated at 500° C. in the presence of 20% $O_2$/He. After the pretreatment, the bed temperature is decreased to 450° C. and direct $NO_x$ decomposition measurements are collected.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A two-stage $NO_x$ abatement device for removal of $NO_x$ from engine exhaust during a cold start, the abatement device comprising:

an enclosure having upstream and downstream portions defined relative to an intended direction of flow of exhaust gas;

a low-temperature $NO_x$ storage component configured to adsorb $NO_x$ when at low temperature, and to desorb $NO_x$ when at higher temperature, and comprising an $NO_x$ abatement composition having a formula $M_x$ $Cu_{1-x}Fe_2O_4$, wherein M is a substitution metal cation that can be any of cobalt, nickel, and zinc; and x is greater than zero and less than one;

a $NO_x$ conversion catalyst located downstream from the $NO_x$ storage component, and configured to catalyze conversion of $NO_x$;

wherein, during an engine cold start, $NO_x$ is retained in the $NO_x$ storage component until the exhaust gas and the abatement device have warmed sufficiently to activate the downstream $NO_x$ conversion catalyst.

2. The two-stage $NO_x$ abatement device as recited in claim 1, wherein the substitution metal cation comprises nickel.

3. The two-stage $NO_x$ abatement device as recited in claim 1, wherein the substitution metal cation comprises cobalt.

4. The two-stage $NO_x$ abatement device as recited in claim 1, wherein the substitution metal cation comprises zinc.

5. The two-stage $NO_x$ abatement device as recited in claim 1, wherein the low-temperature $NO_x$ storage component comprises $Ni_{0.75}Cu_{0.25}Fe_2O_4$.

6. The two-stage $NO_x$ abatement device as recited in claim 1, wherein the low-temperature $NO_x$ storage component comprises less than 5% $Fe_2O_3$ by weight, as determined by Mossbauer spectroscopy.

7. The two-stage $NO_x$ abatement device as recited in claim 1, wherein the downstream $NO_x$ conversion catalyst comprises at least one of a selective catalytic reduction catalyst and a three-way catalyst.

8. A method of synthesizing an $NO_x$ abatement composition, the method comprising:

adding alkali to a mixed-metal nitrate solution until a pH of 9-10 is reached, resulting in precipitation of a crude $NO_x$ abatement composition, the mixed-metal nitrate solution comprising:

$Fe(NO_3)_3$;
$Cu(NO_3)_2$; and
at least one additional metal nitrate selected from the group consisting of:
$Co(NO_3)_2$;
$Zn(NO_3)_2$; and
$Ni(NO_3)_2$.

9. The method as recited in claim 8, wherein the additional metal nitrate comprises $Co(NO_3)_2$.

10. The method as recited in claim 8, wherein the additional metal nitrate comprises $Zn(NO_3)_2$.

11. The method as recited in claim 8, wherein the additional metal nitrate comprises $Ni(NO_3)_2$.

12. The method as recited in claim 8, wherein a combination of $Cu(NO_3)_2$ and the at least one additional metal nitrate is present, relative to $Fe(NO_3)_3$, at a molar ratio of 1:2.

13. The method as recited in claim 8, wherein the at least one additional metal nitrate is present relative to $Cu(NO_3)_2$ at a molar ratio within a range of from about 1:1 to about 3:1, inclusive.

14. The method as recited in claim 8, comprising:
washing the precipitation of the crude $NO_x$ abatement composition to produce a pure $NO_x$ abatement composition.

15. The method as recited in claim 14, comprising:
grinding the pure $NO_x$ abatement composition to a desired particle size.

16. The method as recited in claim 14, comprising:
calcining the pure $NO_x$ abatement composition to remove volatile impurities.

17. A method for direct decomposition removal of $NO_x$ from a gas mixture, the method comprising:

exposing a gas mixture having $NO_x$ to an $NO_x$ abatement composition having a formula $M_xCu_{1-x}Fe_2O_4$, wherein M is a substitution metal cation that can be any of cobalt, nickel, and zinc; and x is greater than zero and less than one; and catalyzing a direct decomposition of the $NO_x$ to generate $N_2$ without a presence of any reductant.

18. The method as recited in claim 17, wherein the step of exposing the gas mixture to the $NO_x$ abatement composition includes passing the gas mixture having $NO_x$ over the $NO_x$ abatement composition at a temperature within a range of from about 450° C. to about 650° C.

19. The method as recited in claim 17, wherein the gas mixture is an exhaust stream from an internal combustion engine.

20. The method as recited in claim 17, wherein the gas mixture is exclusive of reducing agents capable of participating in selective catalytic reduction of $NO_x$.

* * * * *